(12) United States Patent
Pope et al.

(10) Patent No.: US 7,934,982 B2
(45) Date of Patent: May 3, 2011

(54) TAILINGS RETHRESHER MECHANICAL DELIVERY TO RETURN PAN

(75) Inventors: Glenn Pope, Viola, IL (US); Aaron Bruns, Davenport, IA (US)

(73) Assignee: Deere & Company, Moline, IL (US)

( * ) Notice: Subject to any disclaimer, the term of this patent is extended or adjusted under 35 U.S.C. 154(b) by 519 days.

(21) Appl. No.: 11/982,417

(22) Filed: Oct. 31, 2007

(65) Prior Publication Data

US 2009/0111545 A1    Apr. 30, 2009

(51) Int. Cl.
*A01F 12/52*    (2006.01)

(52) U.S. Cl. ......................................................... 460/14

(58) Field of Classification Search ............... 460/11–14
See application file for complete search history.

(56) References Cited

U.S. PATENT DOCUMENTS

| | | | | |
|---|---|---|---|---|
| 1,502,702 A | * | 7/1924 | Wagner | 209/26 |
| 2,309,736 A | * | 1/1943 | Makin | 460/14 |
| 2,433,162 A | | 12/1947 | Scranton et al. | |
| 2,657,801 A | * | 11/1953 | Quilling | 209/300 |
| 2,875,768 A | * | 3/1959 | Hockey et al. | 460/14 |
| 2,893,558 A | | 7/1959 | Zollinger | |
| 3,108,064 A | | 10/1963 | Grant | |
| 3,247,855 A | * | 4/1966 | Kepkay | 460/14 |
| 3,373,871 A | * | 3/1968 | Huether | 209/284 |
| 3,463,314 A | * | 8/1969 | Feterl | 209/254 |
| 3,474,937 A | * | 10/1969 | Frey | 222/227 |
| 3,482,577 A | | 12/1969 | Pauw et al. | |
| 3,581,746 A | | 6/1971 | Louks | |
| 4,062,366 A | | 12/1977 | De Coene | |
| 4,178,944 A | | 12/1979 | Hanaway | |
| 4,292,981 A | * | 10/1981 | De Busscher et al. | 460/14 |
| 4,310,004 A | | 1/1982 | De Busscher et al. | |
| 4,424,634 A | * | 1/1984 | Westelaken | 34/167 |
| 4,466,447 A | | 8/1984 | Hoefer et al. | |
| 4,470,420 A | | 9/1984 | Hanaway | |
| 4,531,528 A | | 7/1985 | Peters et al. | |
| 5,445,563 A | | 8/1995 | Stickler et al. | |
| 5,497,605 A | | 3/1996 | Underwood et al. | |
| 5,498,206 A | | 3/1996 | Underwood et al. | |
| 5,688,170 A | | 11/1997 | Pfeiffer et al. | |
| 6,342,006 B1 | | 1/2002 | Bauch et al. | |
| 6,458,031 B1 | | 10/2002 | Matousek et al. | |
| 6,500,063 B1 | | 12/2002 | Gryspeerdt | |
| 6,669,558 B1 | * | 12/2003 | Wolters et al. | 460/14 |
| 6,672,957 B2 | | 1/2004 | Voss et al. | |
| 7,025,673 B2 | * | 4/2006 | Schmidt et al. | 460/114 |
| 7,052,673 B2 | | 5/2006 | Rajopadhye et al. | |
| 7,070,498 B2 | | 7/2006 | Grywacheski et al. | |
| 7,381,131 B1 | * | 6/2008 | Harpole | 460/114 |

* cited by examiner

*Primary Examiner* — Thomas B Will
*Assistant Examiner* — Mai Nguyen
(74) *Attorney, Agent, or Firm* — Erickson Law Group, PC

(57) ABSTRACT

A rethreshing system and method for a combine having a cleaning system that includes at least one sieve or like material separating mechanism. The rethreshing system includes a tailings collection pan for collecting tailings that do not pass through the sieve and a tailings rethreshing mechanism receiving the tailings from the collection pan and rethreshing the tailings. A distribution auger is arranged across a return pan of the cleaning system and is operable to substantially evenly distribute rethreshed tailings on the return pan of the cleaning system. The distribution auger includes a tubular auger housing having an entrance for receiving material to be conveyed, a closed end opposite the entrance, and a longitudinally elongated and tapered slot formation through a sidewall of the tubular auger housing, the slot formation having a small width near the entrance to the tubular housing and a wide width near the closed end of the tubular housing.

14 Claims, 6 Drawing Sheets

TAILINGS RETHRESHER MECHANICAL DELIVERY TO RETURN PAN

FIELD OF THE INVENTION

This invention relates in general to grain harvesting combines, and in particular to a system for rethreshing tailings from the crop cleaning section of a combine.

BACKGROUND OF THE INVENTION

Agricultural combines are large machines that harvest, thresh, separate and clean an agricultural crop. The resulting clean grain is stored in a grain tank located on the combine. The clean grain can then be transported from the grain tank to a truck, grain cart or other receiving bin by an unloading auger.

A grain harvesting combine has a header which cuts the crop and feeds it upward into a threshing and separating rotor within a housing having a perforated wall. The rotor rotates within the housing, passing grain within clearances between the rotor and perforated housing to thresh grain from the crop.

Rotary combines have one or two large rotors for threshing and separating the harvested crop material. In most rotary combines the rotor or rotors are arranged along the longitudinal axis of the machine. These rotors are provided with an infeed section for receiving harvested crop material, a threshing section for threshing the harvested crop material received from the infeed section and a separating section for freeing grain trapped in the threshed crop material received from the threshing section. Examples are shown in U.S. Pat. Nos. 5,445,563; 5,688,170 and 7,070,498, herein incorporated by reference.

The threshed grain falls onto a grain pan, and from the grain pan onto a set of upper and lower sieves. The sieves are oscillated, causing clean grain to fall through for collection. A blower blows air upward through the sieves, discharging chaff to the rear. Straw from the threshing chamber proceeds through a straw beater and out the rear of the combine.

The clean grain is collected and conveyed to the grain tank. Incompletely threshed grain will not proceed through the fingers of the sieves, yet is too heavy to be blown out the rear along with the chaff. This grain, called "tailings" or "returns" is often returned to the threshing and separating rotor for rethreshing. However, when tailings are returned to the rotor for rethreshing, under some grain conditions, called "white caps", tailings will pass through the rotor yet again without the grain separating from the chaff.

Some prior art grain harvesting combines have dedicated rethreshing rotors for receiving tailings from the sieves, rethreshing the tailings, and passing the tailings back through the primary rotor for rethreshing.

U.S. Pat. No. 5,498,206 discloses a grain combine that includes a primary threshing rotor which rotates to thresh grain from crop, a sieve section for separating grain from chaff, a clean grain conveyor, a clean grain storage tank, and a rethreshing section for rethreshing tailings. The rethreshing section has a rethreshing rotor which receives the tailings from the sieve section. The rethreshing rotor extends completely across an end of the sieve section for rotating about an axis which extends in parallel to the end of the sieve section. The rethreshing rotor includes rasp bars which extend along the end of the sieve section for receiving the tailings and pressing the tailings against a rethreshing pan. Blowers are provided for removing loose chaff from the tailings in the rethreshing section. The rethreshed tailings, including clean grain separated from the tailings by rethreshing, are returned to the primary rotor for rethreshing.

The present inventors have recognized that some prior methods are limited in their ability to prevent grain damage in damage-sensitive crops. The present inventors have recognized that returning tailings directly to the primary threshing and separating rotor leads to greater losses, due to grain re-introduction into the primary rotor, i.e., grain can be recirculated in an endless loop.

SUMMARY OF THE INVENTION

The invention provides a rethreshing system for a combine having a cleaning system that includes at least one sieve or like material separating mechanism. The rethreshing system includes a tailings collection pan for collecting tailings that do not pass through the sieve and a tailings rethreshing mechanism receiving the tailings from the collection pan and rethreshing the tailings. A distribution auger is arranged across the cleaning system and operable to distribute rethreshed tailings on cleaning system.

The cleaning system can include a return pan for distributing crop material onto the sieve and the distribution auger is arranged to substantially evenly distribute rethreshed tailings transversely across the return pan.

Preferably, the distribution auger comprises a tubular auger housing having an entrance for receiving material to be conveyed, a closed end opposite the entrance, and a longitudinally elongated and tapered slot formation through a sidewall of the tubular auger housing, the slot formation having a small width near the entrance to the tubular housing and a wide width near the closed end of the tubular housing.

The preferred embodiment of the invention allows for a tailings return auger to distribute rethreshed tailings directly and in a controlled position and distribution onto the return pan of the cleaning system to be reintroduced to the cleaning sieves. In this regard, the rethreshed tailings need not be recirculated back to the primary processing unit, the threshing and separating rotor, which avoids grain being circulated in an endless loop and allows for fine tuning of the harvesting operation.

The invention also provides a method of rethreshing tailings in an agricultural combine, that includes the the steps of: threshing and separating crops in a threshing and separating mechanism to separate crop material from straw; placing the crop material onto a cleaning system that separates grain from tailings; collecting the tailings; rethreshing the tailings in a rethreshing mechanism separate from the threshing and separating mechanism; collecting the rethreshed tailings; and distributing the rethreshed tailings across the cleaning system.

Preferably, the step of distributing the rethreshed tailings across the cleaning system is further defined in that a horizontal auger is provided with at least one opening along its length that is arranged to evenly distribute the rethreshed tailings across the cleaning system.

Although the invention is illustrated as being used on a rotary combine, the present invention can be used on other combine types including conventional straw walker combines and hybrid combines having transverse threshing cylinders and rotary separators.

Numerous other advantages and features of the present invention will be become readily apparent from the following detailed description of the invention and the embodiments thereof, and from the accompanying drawings.

DETAILED DESCRIPTION OF THE PREFERRED EMBODIMENTS

Figure 1:
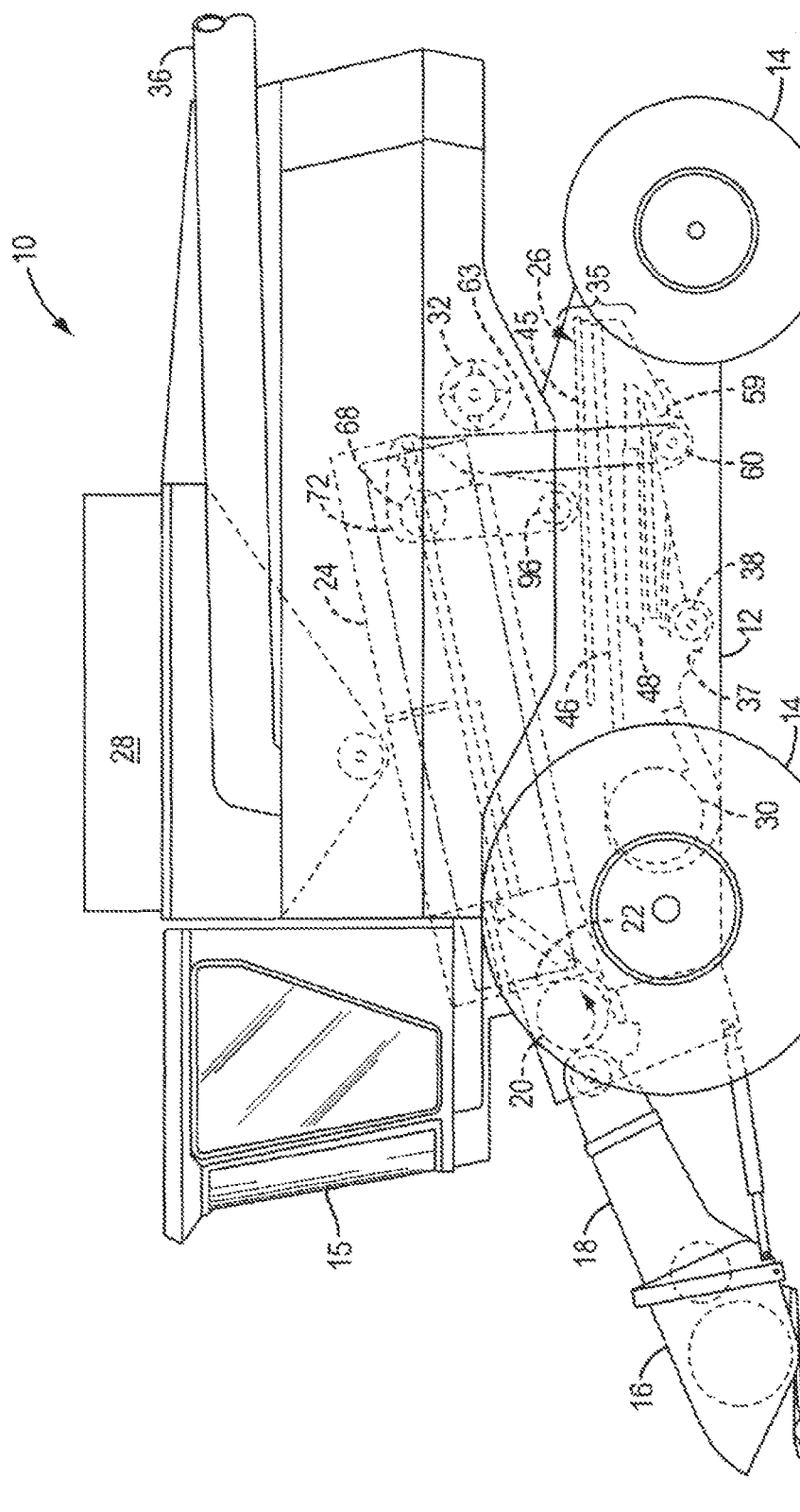
FIG. 1 is a diagrammatic side view of an agricultural combine the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 shows an agricultural combine 10 comprising a supporting structure 12 having ground engaging wheels 14 extending from the supporting structure. The operation of the combine is controlled from an operator's cab 15. A harvesting platform 16 is used for harvesting a crop and directing it to a feederhouse 18. The harvested crop is directed by the feederhouse 18 to a beater 20. The beater directs the crop upwardly through an inlet transition section 22 to the axial crop processing unit 24.

The crop processing unit 24 threshes and separates the harvested crop material. Grain and chaff fall through grates on the bottom of the unit 24 to the cleaning system 26. The cleaning system 26 removes the chaff and directs the clean grain to a clean grain elevator (not shown). The clean grain elevator deposits the clean grain in a grain tank 28. The clean grain in the tank 28 can be unloaded into a grain cart or truck by unloading auger 36. Threshed and separated straw is discharged from the axial crop processing unit 24 through outlet 32 to discharge beater 34. The discharge beater 34 in turn propels the straw out the rear of the combine.

Cleaned grain from the cleaning system 26 is collected in a clean grain pan 37 and fed by means of a grain auger 38 to an elevator (not shown) that conveys the grain into the grain tank 28.

Figure 2:
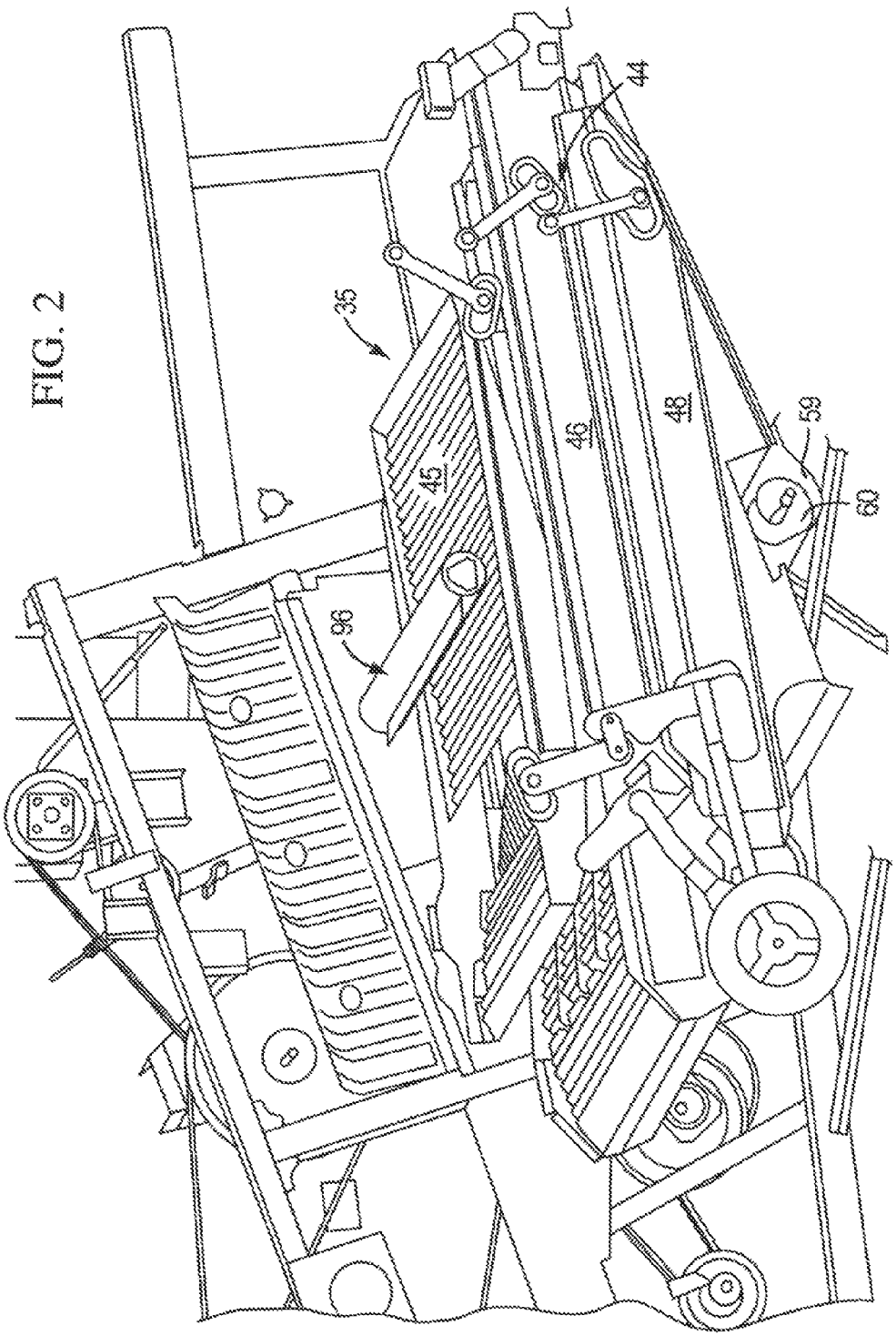
FIG. 2 is a near side, fragmentary, perspective view of a crop cleaning system taken from the combine shown in FIG. 1.

As illustrated in FIG. 2, the cleaning system 26 comprises a cleaning shoe 35 and a cleaning fan 30. The cleaning shoe 35 comprises a frame 44 holding a return pan 45, a chaffer sieve 46 and a lower, secondary sieve 48.

The illustrated cleaning shoe 35 is a reciprocating shoe wherein the return pan 45, the chaffer sieve 46, and the secondary sieve 48 are reciprocated, oscillated or shaken to move crop material and to enhance separation through the sieves.

The chaffer 46 and the lower, secondary sieve 48 are arranged one above the other. The sieves 46, 48 oscillate or otherwise move during the operation of the cleaning shoe 35 in such a way that the harvested material separated by the threshing and separating device 24 is received on the side of the sieves 46, 48 which faces the threshing and separating device 24 and is additionally conveyed opposite the driving direction of the combine 10. In order to achieve an optimal cleaning effect of the cleaning shoe 35, the rotational speed of the blower and the width of the openings in the sieves 46, 48 can be varied.

Figure 6:
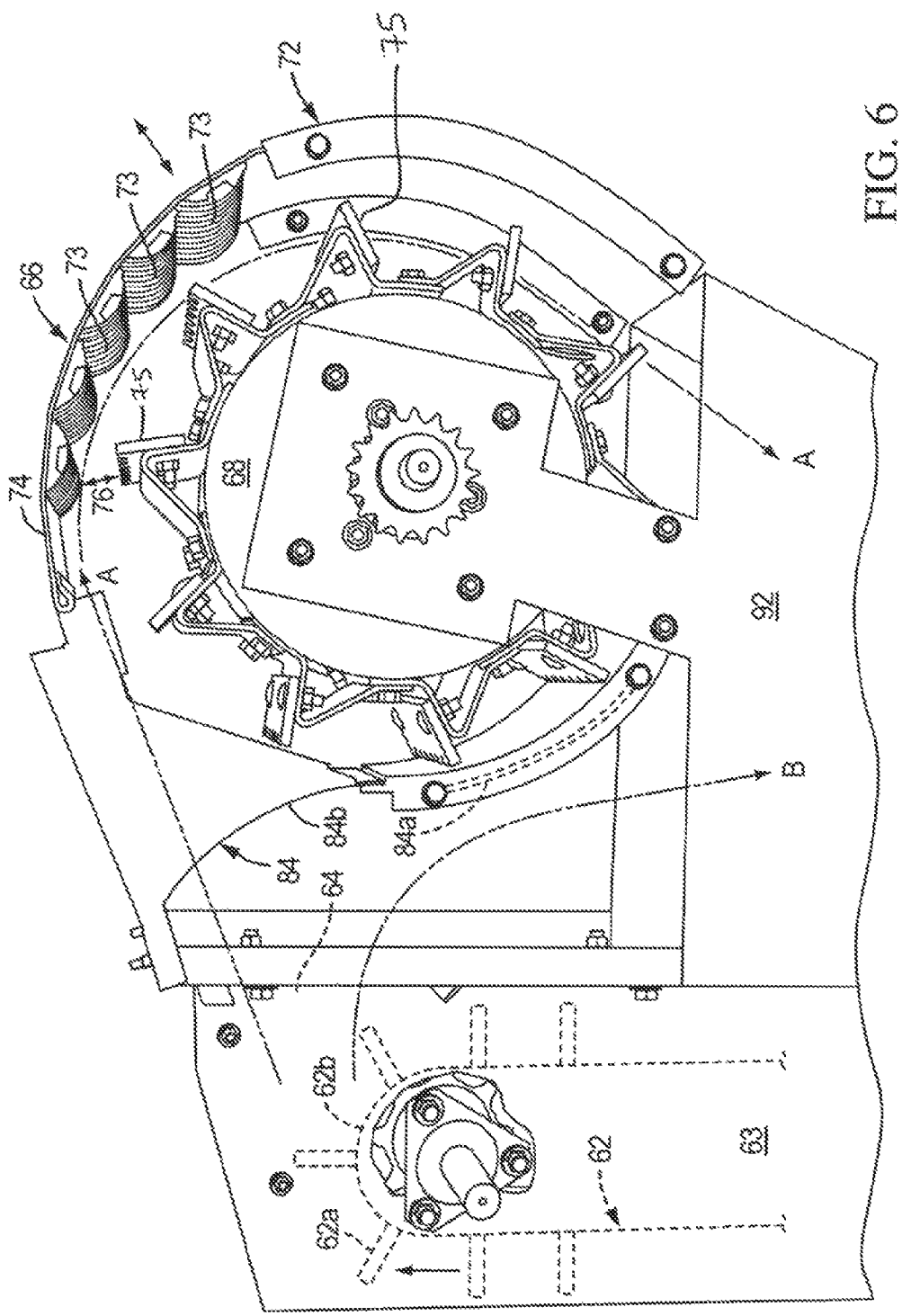
FIG. 6 is a far side, enlarged, fragmentary perspective view of rethreshing rotor and housing taken from FIG. 3, with near side and far side covers removed to view the rotor.

Combine cleaning systems are disclosed in U.S. Pat. Nos. 4,531,528 and 6,672,957; and U.S. Pub. App. Nos. 2002/0128054 and 2005/0164755, all herein incorporated by reference FIGS. 2-6 illustrate non-threshed crop portions or tailings are collected in a tailings pan 59 and moved by a tailings auger 60 to a circulating chain elevator 62 within a housing 63 which elevates the tailings to a discharge opening 64 by way of paddles 62a attached to an endless chain 62b (FIG. 6). Such an elevator is known and is disclosed for example as elevator 54 in U.S. Pat. No. 5,497,605, herein incorporated by reference. As individual paddles 62a carried by the circulating chain turn over at a top of their vertical travel, the paddles 62a propel or fling the tailings into a rethreshing apparatus 66 that comprises a rethreshing rotor 68 driven in rotation within a rethreshing cylinder 72.

Rethreshing rotor 68 rotates within rethreshing cylinder 72. The cylinder 72 includes rasp bars 73 on an adjustable wall 74. There are no perforations in the walls of the cylinder. The rotor includes bars 75 that pass against the rasp bars 73. The rotor can be equipped with different bars depending on the nature of the crop being processed, including rasp bars for difficult threshing crops, swept back bars to allow material to be pushed against the stationary rasp bars for threshing while still allowing good material handling characteristics, or serrated bars for wet material movement.

Gap 76 between rethreshing rotor 68 and the adjustable wall 74 can be selectively adjusted by moving wall 74 either towards or away from rotor 68. Selecting gap 76 defines clearances between rotor 68 and housing 72 for controlling the yield and throughput for rethreshing a particular crop. Rethreshing yield is increased by decreasing gap 76 so that more clean grain is separated from tailings. However, decreasing gap 76 to increase yield decreases throughput, since clearances are reduced. Thus, gap 76 should be set for particular crops to counterbalance throughput verses yield for rethreshing tailings.

As a further enhancement, a deflector plate 84 can be provided within the housing 72 which is effective to cause tailings to bypass the rethreshing rotor 68 and rethreshing cylinder 72. The deflector plate 84 is shown in a first, rethreshing position marked 84a and a second, bypass position marked 84b. Rethreshing crop flow is thrown by the paddles of elevator 62 through the discharge opening 64 in the direction indicated by arrow marked "A" into the rethreshing cylinder 72, and bypass crop flow is thrown downward into a chute 92 in the direction indicated by arrow marked "B."

The rotor 68 is driven on one axial end by a pulley 93 driven by a belt 93a driven by the equipment drive power system of the combine on a near side of the cylinder 72.

Figure 3:
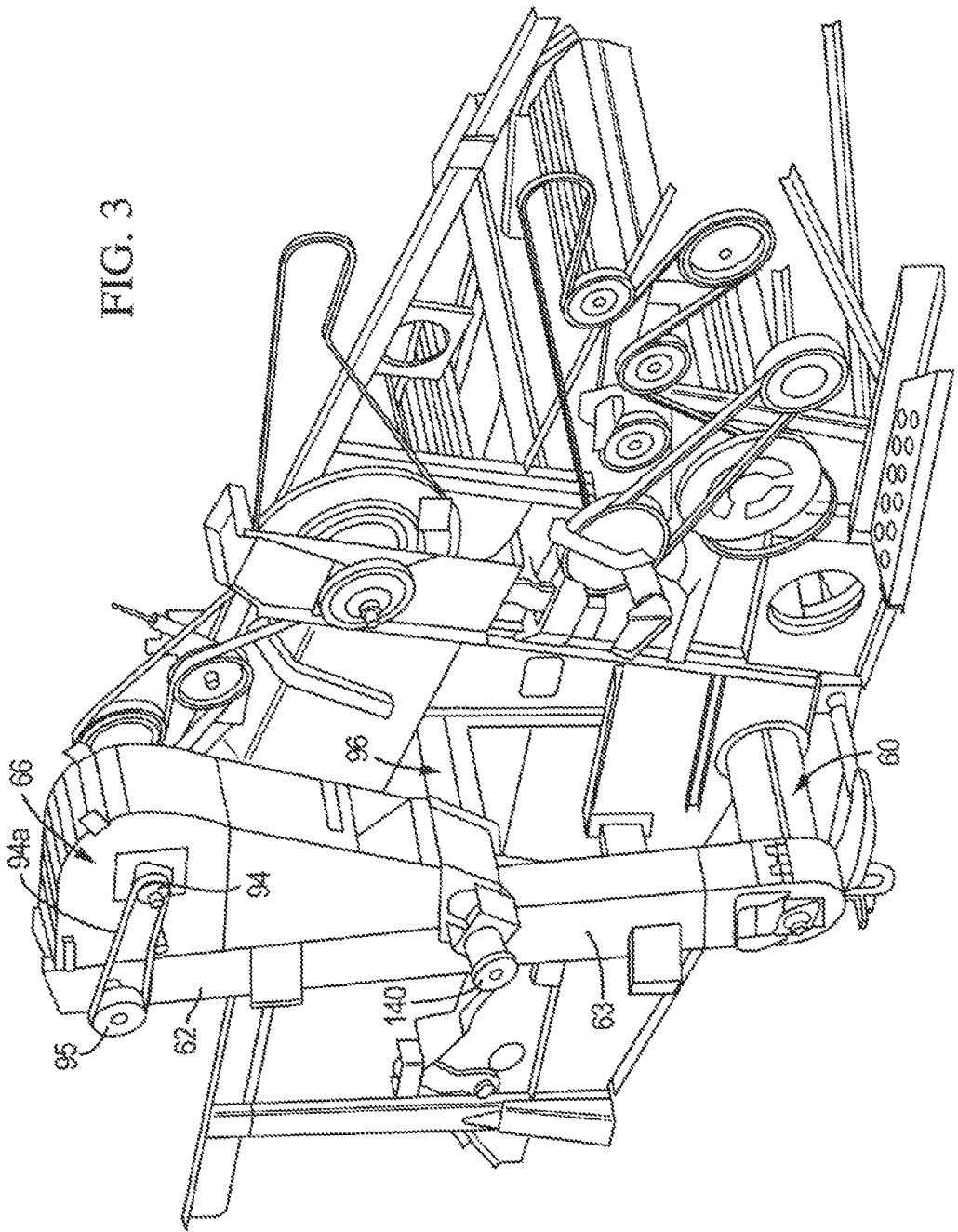
FIG. 3 is a far side, fragmentary, perspective view of a the crop cleaning system of FIG. 2.
Figure 4:
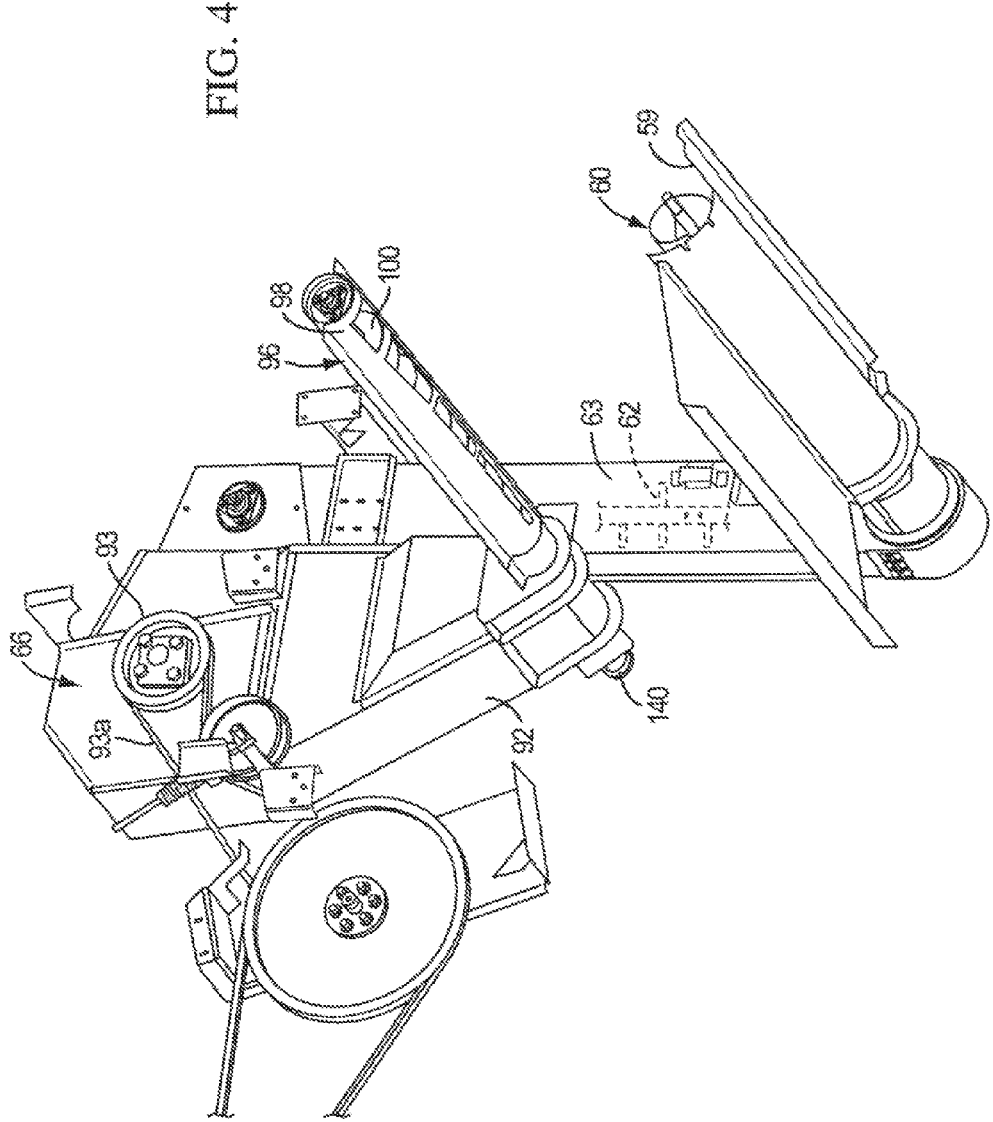
FIG. 4 is a near side, fragmentary, perspective view of a tailings rethreshing system taken from FIG. 2.
Figure 5:
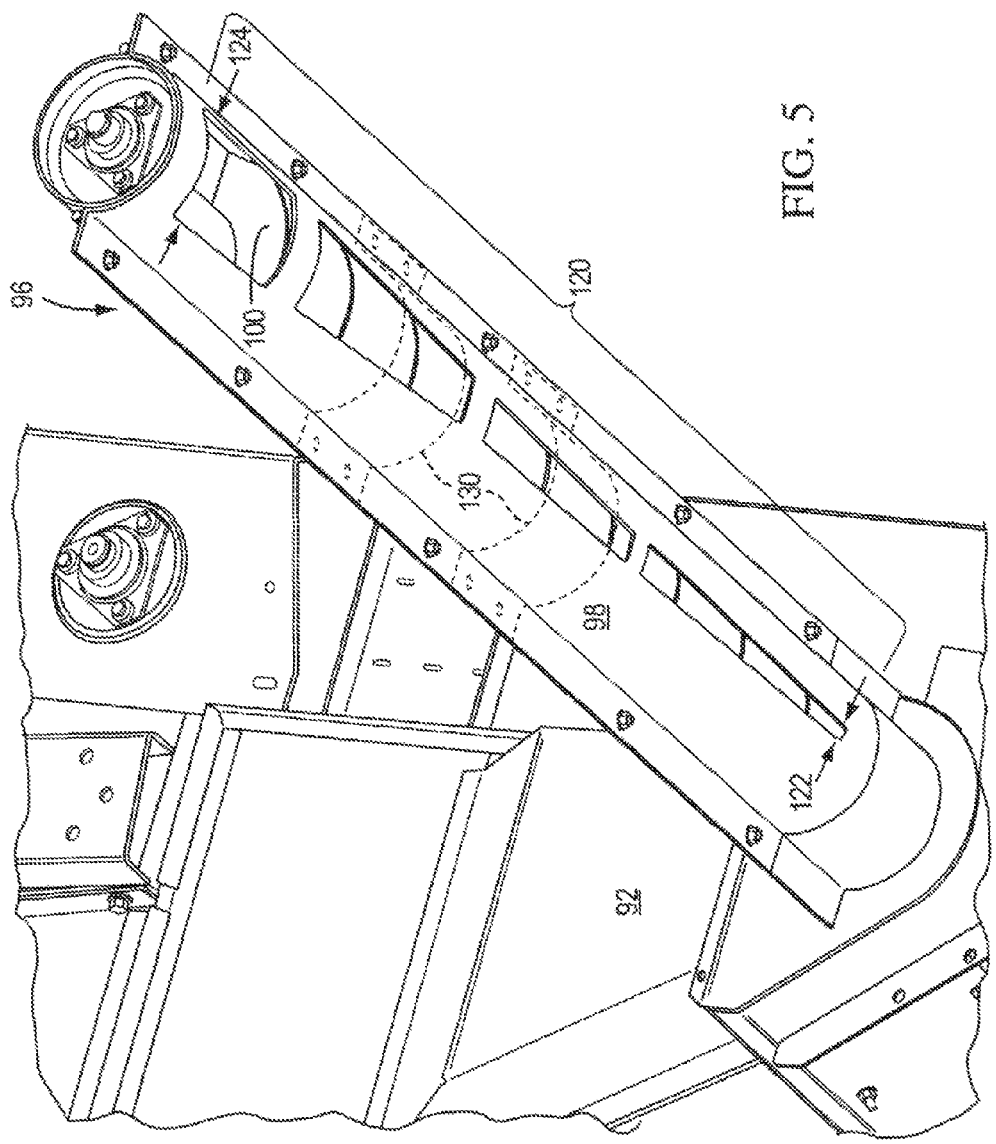
FIG. 5 is a near side, enlarged, fragmentary perspective view of a tailings distributor taken from FIG. 4.

The other axial end of the rotor 68 drives a pulley 94 that circulates a belt 94a, that drives a pulley 95 that drives the circulating chain 62b of the elevator 62 (FIG. 3).

Rethreshing crop flow "A" and/or bypass crop flow "B" exits the cylinder 72 downward through the chute 92 to an auger 96. The auger 96 includes a tubular auger housing 98 and an auger screw 100.

The tubular auger housing 98 is arranged transversely across the cleaning system 26, particularly over the return pan 45. The auger housing includes a tapered slot formation 120 that has a far side small width 122 increasing to a near side maximum width 124. In this way, the tailings conveyed by the auger screw 100 from the chute 92 will be evenly distributed from out of the slot formation 120 transversely across the return pan.

As an enhancement to the slotted design, plural external curved baffles 130 (only two shown in phantom) can be provided on the auger housing 98 which can be slidably positioned and attached to close off areas of the slot formation to fine tune crop distribution on the return pan. Also, the return pan can have baffles, vanes or distributors to further enhance distribution of the tailings delivered from the auger 96.

The auger screw 100 is driven in rotation by a sprocket or pulley 140 located on its far side end that is driven by a belt or chain (not shown) from the equipment drive power system of the combine.

The invention allows for the tailings return auger 96 to distribute rethreshed tailings directly and in a controlled position and distribution onto the return pan 45 of the cleaning system to be reintroduced to the sieves 46, 48. Separated crop material also falls from the separating section of the processing unit 24 onto the return pan 45. In this regard the rethreshed tailings need not be recirculated back to the processing unit 24, which avoids grain being circulated in an endless loop and allows for fine tuning of the harvesting operation.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A rethreshing system for a combine having a cleaning system including at least one sieve, comprising:
a tailings collection pan for collecting tailings that do not pass through said sieve;
a tailings rethreshing mechanism receiving said tailings from said collection pan and rethreshing said tailings; and
a distribution auger arranged across said cleaning system and operable to distribute rethreshed tailings received from the rethreshing mechanism on the cleaning system, said distribution auger disposed within a tubular housing having an entrance for receiving the rethreshed tailings, said housing having at least one slot, wherein a width of the at least one slot at a position further from the entrance to the housing is larger than a width of the at least one slot at a position closer to the entrance to the housing.

2. The rethreshing system according to claim 1, wherein said cleaning system includes a return pan for distributing crop material onto said sieve and said distribution auger is arranged to substantially evenly distribute rethreshed tailings transversely across said return pan.

3. The rethreshing system according to claim 2, wherein said tubular housing is located to receive a downward flowing rethreshed crop flow, and wherein said tubular housing has a closed end opposite said entrance, and said at least one slot comprises a longitudinally elongated and tapered slot formation through a sidewall of said tubular housing, said slot formation having a small width near said entrance to said tubular housing and a wide width near said closed end of said tubular housing.

4. The rethreshing system according to claim 1, comprising:
a tailings auger arranged to convey tailings to one end of the tailings collection pan; and
an elevator arranged to receive the tailings from said tailings auger and to deliver said tailings to said rethreshing mechanism; and
a chute that delivers rethreshed tailings from said rethreshing mechanism to said distribution auger.

5. A rethreshing system for a combine having a cleaning system including at least one sieve, comprising:
a tailings collection pan for collecting tailings that do not pass through said sieve;
a tailings rethreshing mechanism receiving said tailings from said collection pan and rethreshing said tailings; and
a distribution auger arranged across said cleaning system and operable to distribute rethreshed tailings on said cleaning system,
wherein said distribution auger comprises a tubular auger housing having an entrance for receiving material to be conveyed, a closed end opposite said entrance, and a longitudinally elongated and tapered slot formation through a sidewall of said tubular auger housing, said slot formation having a small width near said entrance to said tubular housing and a wide width near said closed end of said tubular housing.

6. The rethreshing system according to claim 5, comprising:
a tailings auger arranged to convey tailings to one end of the tailings collection pan; and
an elevator arranged to receive the tailings from said tailings auger and to deliver said tailings to said rethreshing mechanism; and
a chute that delivers rethreshed tailings from said rethreshing mechanism to said distribution auger.

7. The rethreshing system according to claim 5, wherein said cleaning system includes a return pan for distributing crop material onto said sieve and said distribution auger is arranged to substantially evenly distribute rethreshed tailings transversely across said return pan.

8. An agricultural combine, comprising:
a threshing and separating processing unit;
a cleaning system comprising at least one sieve receiving crop material passing through said threshing and separating unit;
a rethreshing mechanism arranged to receive and rethresh tailings that do not pass through the sieve; and
a distribution mechanism that is arranged to receive rethreshed tailings from said rethreshing mechanism, said distribution arranged to substantially evenly distribute rethreshed tailings across said cleaning system, said distribution mechanism comprising an auger disposed within a tubular housing having an entrance for receiving the rethreshed tailings, said tubular housing having at least one slot, wherein a width of the at least one slot at a position further from the entrance to the housing is larger than a width of the at least one slot at a position close to the entrance to the housing.

9. The combine according to claim 8, wherein said cleaning system includes a return pan for distributing crop material onto said sieve and said distribution auger is arranged to substantially evenly distribute rethreshed tailings transversely across said return pan.

10. The combine according to claim 9, wherein said tubular housing has a closed end opposite said entrance, and said at least one slot comprises a longitudinally elongated and tapered slot formation through a sidewall of said tubular housing, said slot formation having a small width near said entrance to said tubular housing and a wide width near said closed end of said tubular housing.

11. The combine according to claim 8, wherein said tubular housing has a closed end opposite said entrance, and said at least one slot comprises a longitudinally elongated and tapered slot formation through a sidewall of said tubular housing, said slot formation having a small width near said entrance to said tubular housing and a wide width near said closed end of said tubular housing.

12. The combine according to claim 11, comprising:
a tailings auger arranged to convey tailings to one end of the tailings collection pan; and
an elevator arranged to receive the tailings from said tailings auger and to deliver said tailings to said rethreshing mechanism; and
a chute that delivers rethreshed tailings from said rethreshing mechanism to said distribution auger.

13. The combine according to claim 8, comprising:
a tailings auger arranged to convey tailings to one end of the tailings collection pan; and
an elevator arranged to receive the tailings from said tailings auger and to deliver said tailings to said rethreshing mechanism; and
a chute that delivers rethreshed tailings from said rethreshing mechanism to said distribution auger.

14. A method of rethreshing tailings in an agricultural combine, comprising the steps of:
threshing and separating crops in a threshing and separating mechanism to separate crop material from straw;
placing the crop material onto a cleaning system that separates grain from tailings;
collecting tailings;
rethreshing the tailings in a rethreshing mechanism separate from the threshing and separating mechanism;
collecting the rethreshed tailings; and
evenly distributing the rethreshed tailings across the cleaning system wherein a horizontal auger is disposed within a tubular housing having an entrance for receiving the rethreshed tailings, said tubular housing is provided with at least one opening along its length and wherein a width of the at least one opening at a position further from the entrance to the housing is larger than a width of the at least one opening at a position closer to the entrance to the housing.

* * * * *